United States Patent
Chungbin et al.

(10) Patent No.: US 11,440,321 B2
(45) Date of Patent: Sep. 13, 2022

(54) GAS EXPANSION MATERIAL JETTING ACTUATOR

(71) Applicant: XEROX CORPORATION, Norwalk, CT (US)

(72) Inventors: Christopher T. Chungbin, Webster, NY (US); Scott J. Vader, Pittsford, NY (US); Zachary S. Vader, East Amherst, NY (US); Kareem N. Tawil, Pittsford, NY (US); William R. Harris, Rochester, NY (US); David A. Mantell, Rochester, NY (US); Viktor Sukhotskiy, Buffalo, NY (US)

(73) Assignee: XEROX CORPORATION, Norwalk, CT (US)

(*) Notice: Subject to any disclaimer, the term of this patent is extended or adjusted under 35 U.S.C. 154(b) by 364 days.

(21) Appl. No.: 16/712,618

(22) Filed: Dec. 12, 2019

(65) Prior Publication Data
US 2021/0178763 A1    Jun. 17, 2021

(51) Int. Cl.
*B29C 64/209* (2017.01)
*B29C 64/112* (2017.01)
(Continued)

(52) U.S. Cl.
CPC ........ *B41J 2/14314* (2013.01); *B22D 23/003* (2013.01); *B28B 1/001* (2013.01);
(Continued)

(58) Field of Classification Search
CPC ...... B41J 2/14; B41J 2/14314; B41J 2202/04; B28B 1/001; B29C 64/112; B29C 64/209;
(Continued)

(56) References Cited

U.S. PATENT DOCUMENTS

| 5,130,722 A | 7/1992 | Onishi |
| 8,721,032 B2 | 5/2014 | Kuznetsov et al. |

(Continued)

FOREIGN PATENT DOCUMENTS

| JP | S59209884 A | 11/1984 |
| JP | S61149359 A | 7/1986 |

(Continued)

OTHER PUBLICATIONS

Extended European Search Report issued in corresponding European Application No. 20210488.1, 13 pages.
(Continued)

*Primary Examiner* — Anh T Vo
(74) *Attorney, Agent, or Firm* — MH2 Technology Law Group LLP

(57) ABSTRACT

A jetting assembly that can be used to print a high-temperature print material such as a metal or metal alloy, an aqueous ink, or another material, includes an actuator for heating a gas such as a non-volatile gas within a gas cavity. The actuator rapidly heats the gas within the gas cavity, which rapidly increases a volume of the gas, thereby applying a pressure to the print material within an expansion channel that is in fluid communication with the gas cavity. In turn, the print material within the expansion channel applies a pressure to the print material within a nozzle bore, which forces a drop of the print material from a nozzle. The jetting assembly further includes a supply inlet that supplies the print material to the expansion chamber and the nozzle bore, for example, from a reservoir.

21 Claims, 7 Drawing Sheets

(51) Int. Cl.
*B33Y 70/00* (2020.01)
*B41J 2/14* (2006.01)
*B33Y 10/00* (2015.01)
*B33Y 30/00* (2015.01)
*B22D 23/00* (2006.01)
*B28B 1/00* (2006.01)

(52) U.S. Cl.
CPC .......... B29C 64/112 (2017.08); B29C 64/209 (2017.08); B33Y 10/00 (2014.12); B33Y 30/00 (2014.12); B33Y 70/00 (2014.12)

(58) Field of Classification Search
CPC ...... B22D 23/003; B33Y 10/00; B33Y 30/00; B33Y 70/00
See application file for complete search history.

(56) References Cited

U.S. PATENT DOCUMENTS

| | | | |
|---|---|---|---|
| 8,888,250 | B2 | 11/2014 | Law et al. |
| 9,616,494 | B2 | 4/2017 | Vader et al. |
| 10,040,119 | B2 | 8/2018 | Vader et al. |
| 2009/0262150 | A1* | 10/2009 | Morita ................ B41J 2/175 347/17 |
| 2014/0022311 | A1 | 1/2014 | Law et al. |
| 2015/0375511 | A1* | 12/2015 | Obata ................ B41J 2/175 347/31 |

FOREIGN PATENT DOCUMENTS

| | | |
|---|---|---|
| JP | H02188251 A | 7/1990 |
| JP | H10175295 A | 6/1998 |
| JP | H11105275 A | 4/1999 |
| WO | 2004/091911 A2 | 10/2004 |

OTHER PUBLICATIONS

Sukhotskiy et al., "Magnetohydrodynamic Drop-on-Demand Liquid Metal 3D Printing," Solid Freeform Fabrication 2017: Proceedings of the 28th Annual International Solid Freeform Fabrication Symposium—An Additive Manufacturing Conference, pp. 1806-1811.

Karampelas et al., "Drop-on-Demand 3D Metal Printing," Informatics, Electronics and Microsystems: TechConnect Briefs, 2017, pp. 153-155.

* cited by examiner

GAS EXPANSION MATERIAL JETTING ACTUATOR

TECHNICAL FIELD

The present teachings relate to the field of printing, such as three dimensional printing, functional printing, and other printing and, more particularly, to methods and structures for printing non-volatile materials such as an aqueous inks or high melting point temperature materials such as metals and metal alloys.

BACKGROUND

Techniques for printing three dimensional (3D) structures currently include Fused Filament Fabrication (FFF), which typically prints an extruded polymer, Stereolithography (SLA), which uses a laser to cure or harden a liquid resin, Selective Laser Sintering, which uses a laser to sinter a powdered polymer material, and binder jetting, which deposits a liquid binding agent such as cyanoacrylate to bond powdered particles together. In particular, binder jetting typically includes the use of inkjet printhead technology to deposit the binder onto the powdered particles. Three dimensional printing requires the printing of structures and surfaces at all orientations.

Jetting or ejecting a non-volatile print material such as aqueous inks or a print material having a high melting point such as metals and metal alloys presents particular problems that render the use of conventional printheads such as inkjet printheads impractical or impossible. Thermal inkjet jetting techniques require volatile solvents within the material itself, which are not present in metal. Piezoelectric printheads typically include synthetic materials such as polymers that flow at temperatures below the melting temperature of metal. Additionally, piezoelectric elements within piezoelectric printheads depolarize and lose their piezoelectric properties when heated above their Curie temperature. Piezoelectric printheads are therefore unsuitable for exposure to high temperatures associated with molten metal. Providing a thermal insulation with piezoelectric printhead to enable metal printing comes with tradeoffs in printing efficiency and drop control.

Printers incorporating magnetohydrodynamic printing technology have been used to successfully eject metal. However, the printheads used in these printers have a high operating power and a large footprint.

A method and structure for jetting and printing a material such as metal that has a high melting temperature and a low volatility would be a welcome addition to the art.

SUMMARY

The following presents a simplified summary in order to provide a basic understanding of some aspects of one or more implementations of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later.

In an implementation of the present teachings, a jetting assembly for ejecting a print material includes a jetting assembly block. The jetting assembly block defines a nozzle bore terminating in a nozzle from which a print material is ejected, an expansion channel that transitions into the nozzle bore, a gas cavity that transitions into the expansion channel, and a supply inlet for supplying a print material to the expansion channel and the nozzle bore. The expansion channel is separated from the nozzle bore at the supply inlet. The jetting assembly further includes an actuator configured to expand a gas within the gas cavity. Optionally, the jetting assembly further includes a gas within the gas cavity and a print material within the expansion channel, the supply inlet, and the nozzle bore. The print material can be a molten metal or molten metal alloy and may include at least one of copper, aluminum, lead, tin, zinc, iron, magnesium, nickel, titanium, gold, and silver. In another implementation, the print material can be an aqueous ink, or a material that includes at least one of a solvent, a pigment, a polymer-based ink, a resin, an ultraviolet-cured polymer, glass, a ceramic, a binder, a ceramic precursor, or a polymer precursor. The actuator can include at least two electrodes positioned within the gas cavity and configured to generate an electrical discharge into the gas cavity. At least one of the two electrodes can be or include the print material. The jetting assembly can include a gas within the gas cavity, wherein the gas includes argon, nitrogen, carbon dioxide, helium, and combinations thereof. The jetting assembly block can also define a gas inlet in fluid communication with a gas supply and the gas cavity, and a gas exhaust in fluid communication with the gas supply and the gas cavity.

In another implementation, a method for ejecting a print material from a jetting assembly can include firing an actuator to heat a volume of a gas within a gas cavity, increasing the volume of the gas responsive to the firing of the actuator, applying a pressure to a print material within an expansion channel using the increasing volume of the gas, wherein the expansion channel in in fluid communication with a nozzle bore and a nozzle, and ejecting a drop of the print material from the nozzle responsive to the firing of the actuator. Optionally, the ejecting of the drop of the print material can eject a molten metal or molten metal alloy, and the molten metal or metal alloy can include at least one of copper, aluminum, lead, tin, zinc, iron, magnesium, nickel, titanium, gold, and silver. Optionally, the ejecting of the drop of the print material ejects an aqueous ink. Further optionally, the ejecting of the drop of the print material can eject at least one of a solvent, a pigment, a polymer-based ink, a resin, an ultraviolet-cured polymer, glass, a ceramic, a binder, a ceramic precursor, or a polymer precursor. In an implementation, the gas within the gas cavity can include at least one of argon, nitrogen, carbon dioxide, helium, and combinations thereof.

In an optional implementation, the firing of the actuator can include generating an electrical discharge into the gas cavity, and can further include generating the electrical discharge using at least two electrodes, wherein one of the at least two electrodes is the print material. Further optionally, a surface of the print material at an interface with the gas within the gas cavity can maintain a roughly constant shape from the firing of the actuator to the ejecting of the drop of the print material from the nozzle.

In an optional implementation, the jetting assembly can include a block that defines a gas inlet in fluid communication with the gas cavity and a gas exhaust in fluid communication with the gas cavity and the gas inlet, and the method can further include regulating the volume of the gas within the gas cavity by injecting the gas from a gas source through the gas inlet into the gas cavity and/or exhausting the gas from the gas cavity through the gas exhaust.

The jetting assembly can include a plurality of nozzle bores terminating in a plurality of nozzles and, in this implementation, the method can further include ejecting a plurality of drops of print material from the plurality of nozzles sequentially or simultaneously.

BRIEF DESCRIPTION OF THE DRAWINGS

The accompanying drawings, which are incorporated in, and constitute a part of this specification, illustrate implementations of the present teachings and, together with the description, serve to explain the principles of the disclosure. In the figures.

It should be noted that some details of the figures have been simplified and are drawn to facilitate understanding of the present teachings rather than to maintain strict structural accuracy, detail, and scale.

DETAILED DESCRIPTION

Reference will now be made in detail to exemplary implementations of the present teachings, examples of which are illustrated in the accompanying drawings. Generally and/or where convenient, the same reference numbers will be used throughout the drawings to refer to the same or like parts.

As used herein, unless otherwise specified, the word "printer" encompasses any apparatus that performs a print outputting function for any purpose. Further, three dimensional (3D) printing is also referred to herein as "additive manufacturing."

As discussed above, 3D printing of non-volatile materials and materials having a high melting point presents the particular challenges described. An implementation of the present teachings includes a jetting assembly that can be used to eject non-volatile materials such as aqueous inks as well as materials having a high melting point such as a metals or metal alloys. An implementation can further include a printer that incorporates a jetting assembly according to the present teachings, and a method for printing that can include the use of a jetting assembly according to the present teachings. It will be appreciated that the structures as drawn and described herein are non-limiting examples for descriptive purposes, and that related structures and methods that fall within the scope of the current teachings and the claims will become apparent to one of ordinary skill in the art. As such, structures and designs that are manufactured as implementation of the present teachings may include additional features that have not been depicted for simplicity, while various depicted features may be removed or modified.

Figure 1:
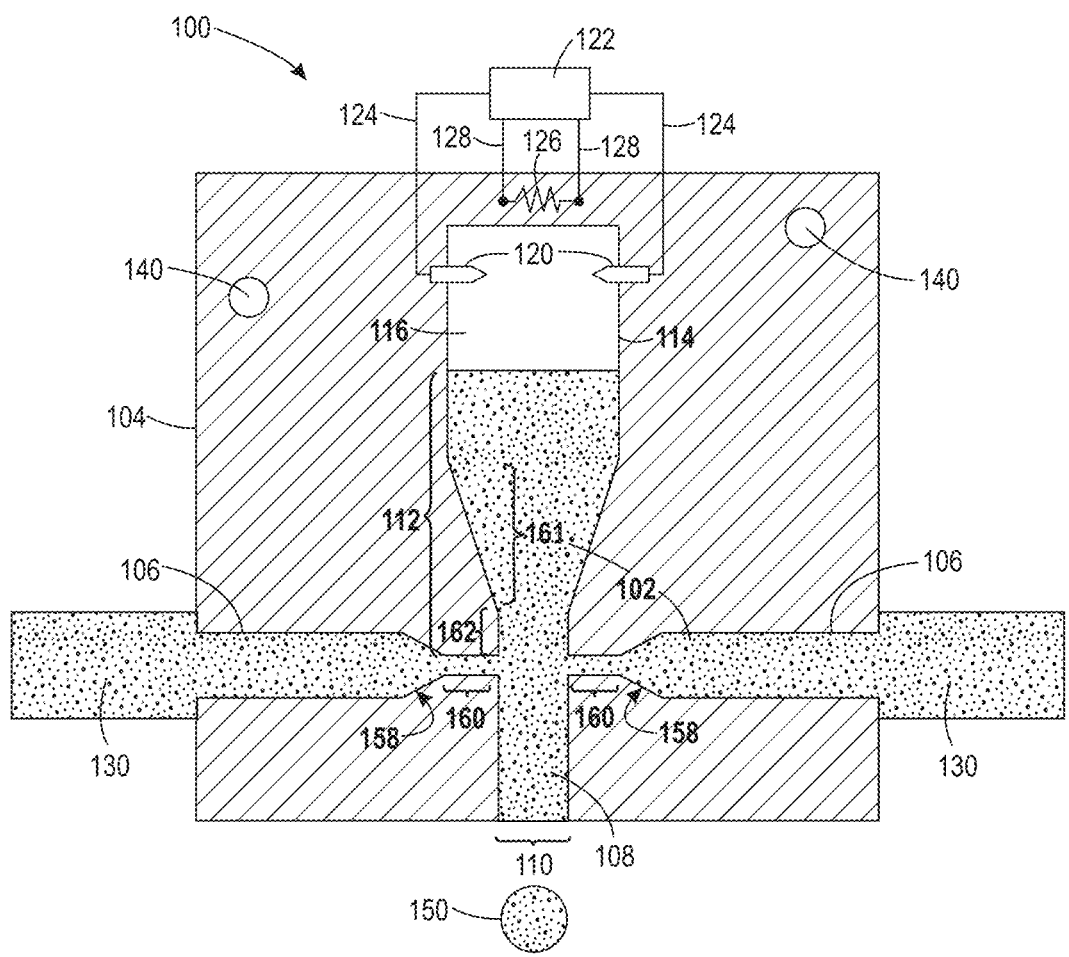
FIG. 1 is a schematic cross sectional depiction of a jetting assembly according to an implementation of the present teachings.

FIG. 1 is a schematic cross section of a portion of a jetting assembly 100 for ejecting a fluid or print material 102 in accordance with an implementation of the present teachings. The jetting assembly 100 may be a subassembly of a printhead and/or a printer. The jetting assembly 100 includes a jetting assembly block 104 that defines a plurality of channels, where the plurality of channels includes at least one supply inlet 106 (two of which are depicted in FIG. 1), a nozzle bore 108 that ends or terminates in an aperture or nozzle 110 from which a drop 150 of the print material 102 is ejected during use, an expansion channel 112, and a gas cavity 114 having a gas 116 that is trapped or entrained therein. In one aspect, a volume of the gas 116 itself forms the gas cavity 114, which has a variable size or volume depending on the volume of the gas 116. For purposes of description, the expansion channel 112 is generally continuous with the nozzle bore 108, and separated from the nozzle bore 108 at the supply inlet 106. Each of the gas cavity 114, the expansion channel 112, the nozzle bore 108, and the supply inlet 106 are in fluid communication, each with the other. As depicted, the gas cavity 114 transitions into the expansion channel 112, and the expansion channel 112 transitions into the nozzle bore 108 at the supply inlet 106. It will be appreciated that supply inlets 106 depicted in the cross section of FIG. 1 can be a single circular, disk-shaped or radial supply inlet 106 that encircles the nozzle bore 108 through 360°, and thus supplies the expansion channel 112 and nozzle bore 108 with print material 102 laterally through 360°.

The jetting assembly 100 further includes an actuator 120 positioned within the gas cavity 114. The actuator 120 can be connected to a power source 122, such as a direct current (DC) or alternating current (AC) power source, using suitable electrical connections 124. Furthermore, the block 104 can be heated by a heating element 126. In an implementation, the heating element 126 can include, for example, a resistive heating element 126 that is also be connected to the power source 122 using second electrical connections 128.

It will be appreciated that, in some implementations, the jetting assembly 100 will not include the print material 102, for example, during and after manufacture, and prior to use. In other implementations, the jetting assembly 100 will include the print material 102.

The print material 102 can be or include, for example copper, aluminum, lead, tin, zinc, iron, magnesium, nickel, titanium, gold, and silver, and alloys including one or more of these metals. In other uses, the print material 102 can be or include solder, a conventional aqueous ink or non-aqueous ink (each of which includes a solvent and a pigment), polymer-based inks and resins such as ultraviolet-cured (UV-cured) polymers, glass, a ceramic, a binder as applied during binder jetting, or reactants which form a ceramic or a polymer (i.e., a ceramic precursor or a polymer precursor). Thus in some implementations, the print material 102 can have a melting point that is above 1,000 Kelvin (K), for example, from about 900K to about 1,300K. In other implementations, the print material can have a melting point that is below 1,000K, for example, in the range of about 273K to about 775K, and thus printing can occur, for example, at room temperature (i.e., from about 293K to about 299K). When the jetting assembly 100 is in a standby state (i.e., in a state where printing could occur), the print material 102 can be heated to a temperature that is above the melting point of the print material, for example, from about 50K to about 400K above, or from about 100K to about 300K above, or about 200K above the melting point of the print material. If the print material 102 is heated to too low of a temperature, a viscosity of the print material 102 may be insufficient for jetting from the nozzle 108. Heating the print material 102 excessively can result in a vaporization of the print material 102, and contamination of the gas 116. When the jetting assembly 100 is in an off state, the temperature of the print material 102 can be at room temperature. At room temperature and the standby state, a metal print material 102 is frozen within the channels 106, 108, 112 while an aqueous ink will remain liquid. Materials that freeze within the channels 106, 108, 112 will typically be frozen and thawed gradually to avoid damage to the block 114 from expansion and contraction of the block 104 and print material 102. In some implementations, the print material 102 having an interface with the gas 116 can be allowed to freeze last so that the relatively more compressible and expansible gas 116 within the gas cavity 114 cushions the expansion and contraction of the print material 102.

In applications that use a molten metal or metal alloy as the print material 102, the block 104 of the jetting assembly 100 is manufactured from a material that is resistant to damage from the high temperatures required to melt the print material 102, wherein the print material 102, when melted, has a viscosity that is suitable for ejection from the nozzle 110. For example, the block 104 can be manufactured from ceramic and/or a refractory metal. While FIG. 1 depicts the block 104 as a solid block of material, it will be appreciated that the block 104 can be assembled from two or more separate pieces or sections to simplify manufacture.

The one or more supply inlets 106 can be in fluid communication with one or more reservoirs 130 that store a volume of the print material 102 and supply the print material 102 to the supply inlet 106. The supply inlet 106 is configured to supply the print material 102 to the expansion channel 112 and the nozzle bore 108. The reservoir 130, therefore, is also in fluid communication with the expansion channel 112, the nozzle bore 108, and the nozzle 110.

The heating element 126 can be or include a resistive heating element 126 within the block 104, where the resistive heating element 126 is electrically coupled to the power supply 122. In another implementation, the heating element 126 can be or include one or more fluid channels 140 that are used to circulate a heated fluid through the block 104. The heating element heats the block 104 and the print material 102 to at least the melting point of the print material 102.

During a printing process, the drop 150 of the print material 102 is ejected from the nozzle 110 using a heating operation by the actuator 120 to rapidly heat the gas 116 trapped in the gas cavity 114, thereby causing the gas 116 to rapidly expand. This rapid expansion of the gas 116 increases a volume of the gas cavity 114, which generates a pressure that is transferred to the print material 102 within the expansion channel 112, then to the print material 102 within the nozzle bore 108. Displacement of the print material 102 within the nozzle bore 108, in turn, ejects the drop 150 of the print material 102 from the nozzle 110.

Various structures for providing the actuator 120 and mechanisms for causing the expansion of the gas 116 within the gas cavity 114 are contemplated. For example, the actuator 120 can include a pair of electrodes, where a voltage from the voltage source 122 is applied to the pair of electrodes to generate an electrical discharge such as arc or corona into the gas 116 within the gas cavity 114. An electrical current of the electrical discharge passes through the gas 116, thereby heating and expanding the gas 116. If the print material 102 is electrically conductive, the print material 102 itself can function as one of the electrodes of the electrode pair, or the actuator 120 can include a dedicated pair of electrodes. It will be appreciated that more than two electrodes can be provided within the gas cavity 114, for example, to better control the electrical discharge which, in turn, can improve uniformity of the expansion of the gas 116 and reproducibility of the drop ejection. In another implementation, the actuator 120 can include a resistive element in physical contact with the gas 116 and/or the walls of the gas cavity 114. An electrical current is passed through the resistive element, which heats the resistive element, where the heat is transferred to the gas 116, thereby heating the gas 116. In another implementation, the actuator 120 can be or include a concentrated or high-intensity light source such as a laser generates a light beam that is directed onto the gas 116. The gas 116 absorbs the light energy and is rapidly heated by the absorption of the light energy. Alternately, the light beam can be directed onto a target suspended within the gas cavity 116 or the cavity walls, which then transfer heat to the gas 116. In an implementation, the electrical discharge can heat the gas 116 to a temperature of from about 1,000K to about 3,000K. depending, in part, on the melting point of the print material 102.

In the depiction of FIG. 1, the gas 116 within the gas cavity 114 can be or include, for example, helium, nitrogen, neon, argon, carbon dioxide, or a mixture of these gases. In an implementation of the jetting assembly, the gas 116 can be an inert gas that does not readily chemically react with the print material 102, and can be a nonvolatile gas (i.e., a gas that does not combust when exposed to an arc or flame). Further, the material used for the gas 116 preferably has a minimal or very low solubility within the print material 102 to avoid contamination of the print material 102. The gas 116 provides a gas bubble that is trapped within the expansion channel 112, and thus the volume of the gas 116 forms the gas cavity 114 within the expansion channel 112. A target volume of the gas 116 will depend on the characteristics of the gas 116, the dimensions and contours of the various channels 106, 108, 112, the viscosity of the print material 102, the thermal losses to the block 104, etc. Ideal gases, for example, increase in volume by about 300% when heated from a starting temperature of 1,000K to an ending temperature of 3,000K at a constant pressure. The volume of the gas 116 will affect various operational characteristics of the jetting assembly, for example, the energy input required to sufficiently expand the volume of the gas cavity 114, the displacement available to eject a drop 150, and rate of cooling of the entrained gas 116 as described below with reference to FIGS. 4-6. Generally, the energy required to sufficiently heat the gas 116 is proportional to the gas volume and a molar heat capacity ($MC_v$) of the specific gas used.

Figure 6:
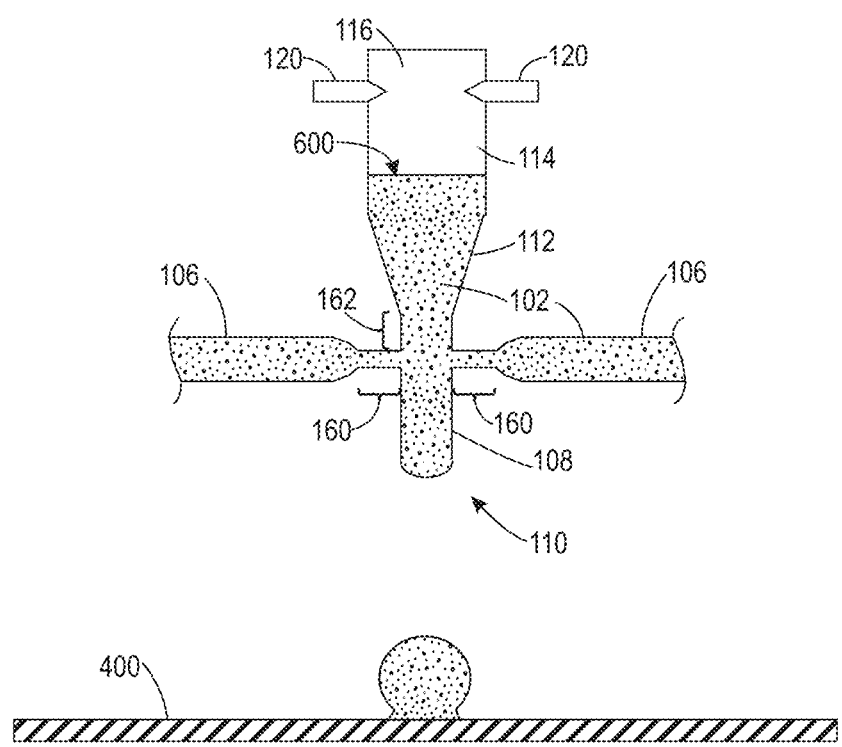
FIG. 6 is a depiction of the FIG. 5 jetting assembly during a subsequent point in the printing process.

The contours of the channels 106, 108, 112 can be tuned with various features to better direct and control the pressures within the channels 106, 108, 112 upon a firing of the actuator 120 to expand the gas 116 and the gas cavity 114. FIG. 1 depicts that each fluid supply inlet 106 narrows along a first converging part 158 to a first throat 160 before it opens into the nozzle bore 108. FIG. 1 further depicts that expansion channel 112 narrows along a second converging part 161 to a second throat 162 as it transitions into the nozzle bore 108 at the supply inlet(s) 106. The expansion channel 112 thus has a first width (for example, at a surface 600 of the print material 102 as depicted in FIG. 6 where the gas 116 interfaces with the gas 116) and the nozzle bore 108 has a second width, where the second width of the nozzle bore 108 is narrower than the first width of the expansion channel 112. When the actuator 120 is fired, the first throat(s) 160 restrict a resulting pressure wave from creating a backpressure within the supply inlet 106, such that the pressure wave is directed from the expansion channel 112 into the nozzle bore 108. The second throat 162 decreases a width of the nozzle bore 108 compared to a width of the expansion channel 112, thus decreasing the dynamic pressure at the supply inlets 106.

Figure 2:
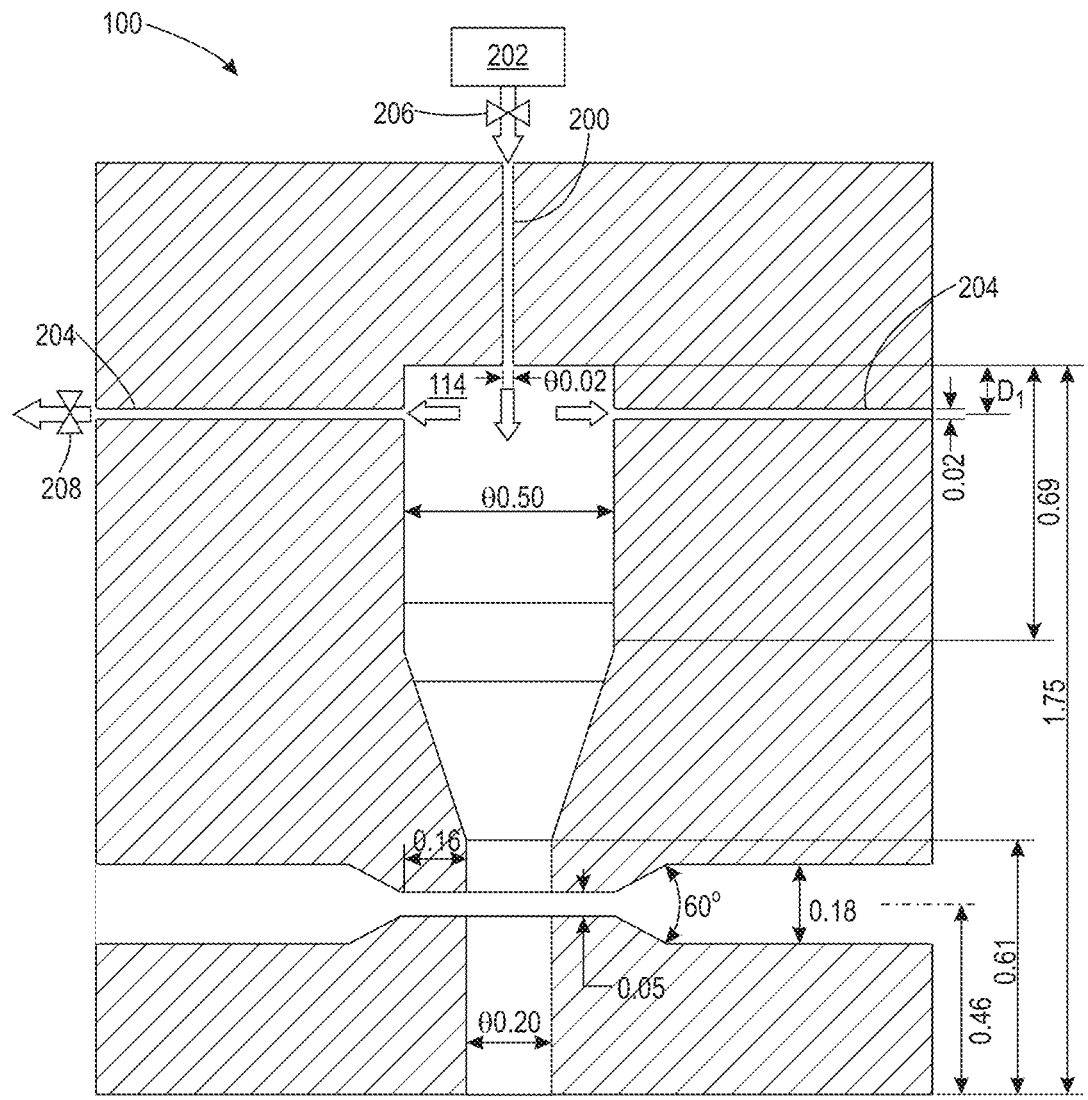
FIG. 2 is shows example dimensions for the jetting assembly of FIG. 1.

FIG. 2 depicts the jetting assembly 100 of FIG. 1 with example dimensions and units in millimeters (mm). It will be appreciated that the features and dimensions of the jetting assembly 100 of FIG. 2 may vary depending on the print material and printing requirements of the anticipated use of the jetting assembly 100, as well as design tolerances. Some implementations can require structures having larger dimensions, or smaller dimensions, or both larger and smaller dimensions than those specified. Thus the dimensions depicted are intended to be an example to provide scale for a specific design rather than being limiting.

FIG. 2 further depicts gas regulation channels defined by the block 104, including at least one gas inlet 200 in fluid communication with a gas supply 202 and the gas cavity 114, and at least one gas exhaust or gas outlet 204 in fluid communication with the gas inlet 200 and the gas cavity 114. A flow of the gas 116 from the gas supply 202 to the gas inlet 200 then to the gas cavity 114 can be controlled, for example, by an inlet valve 206. Similarly, an exhaust of the gas 116 from the gas cavity 114 can be controlled by an exhaust valve 208. (For simplicity of depiction, only one exhaust valve 208 is depicted in FIG. 2 on the gas outlet 204 that flows toward the left of the figure, but it will be appreciated that flow of the gas 116 through the gas outlet 204 that flows toward the right of the figure will also be controlled by a similar exhaust valve 208.) With reference to the orientation of FIG. 2, the gas outlet 204 can be vertically spaced from the gas inlet 200 by a vertical spacing or distance "$D_1$" from an upper surface of the gas cavity 114 to the gas outlet 204 so as to control a level and/or volume of the gas 116 supplied into the gas cavity 114 through the gas inlet 200. In this implementation, the gas 116 can be injected into the gas cavity 114 through the gas inlet 200. Once a desired volume of the gas 116 is maintained or present within the gas cavity 114 as determined by the vertical spacing $D_1$, any excess gas 116 is exhausted through the gas outlet 204. A level of the gas 116 within the gas cavity 114 can be increased, maintained, decreased, and/or otherwise regulated using a flow of gas into the gas cavity 114 from the gas inlet 202 and a flow of gas out of the gas cavity 114 from the gas exhaust 204. This flow of the gas 116 into and out of the gas cavity 114 can be performed, for example, during a standby period when the ejector 120 is not being fired.

Figure 3:
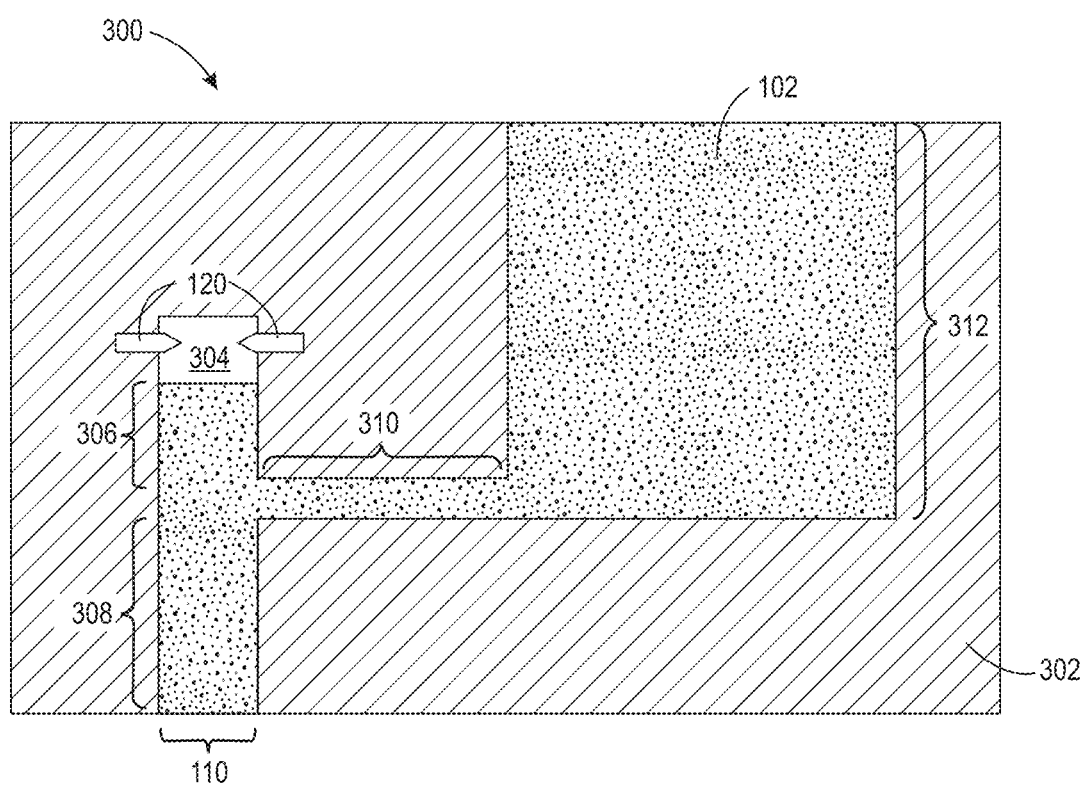
FIG. 3 is a schematic cross sectional depiction of a jetting assembly according to another implementation of the present teachings.

FIG. 3 depicts a jetting assembly 300 according to another implementation of the present teachings. The jetting assembly 300 includes a block 302 that defines a gas cavity 304, an expansion channel 306, a nozzle bore 308, a supply inlet 310 and a reservoir 312. FIG. 3 further depicts a print material 102 within the reservoir 312, the supply inlet 310, the expansion channel 306, and the nozzle bore 308. For purposes of description, the expansion channel 306 is generally continuous with the nozzle bore 308, and separated from the nozzle bore 308 at the supply inlet 310. The jetting assembly 300 of FIG. 3 further includes an actuator 120 as described above with reference to FIG. 1. It will be understood that a jetting assembly 300 can include other features that have not been depicted for simplicity, while various depicted features can be removed or modified.

FIGS. 1 and 4-6 depict the jetting assembly 100 of FIG. 1 during a simulated printing operation. The simulation was modeled using 7075 aluminum as the print material 102, which has a liquidus of about 908K, at a printing temperature of 1,123K.

Figure 4:
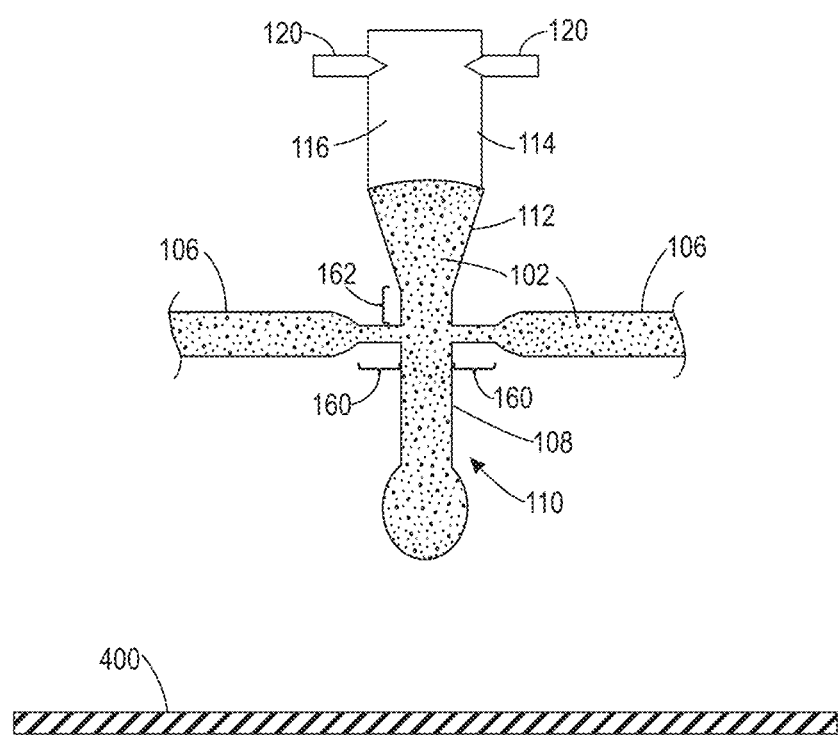
FIG. 4 is a depiction of the FIG. 1 jetting assembly during a printing process subsequent to firing an actuator.

FIG. 1 depicts the jetting assembly 100 immediately prior to firing the actuator 120 when the print material 102 and pressures within the jetting assembly 100 are stabilized and are in a state of equilibrium. This is the start of a printing cycle, where time 1 is 0 (i.e., $T_1=0$). The subsequent firing of the actuator 120 increases a temperature and a volume of the gas 116, as well as a pressure within the gas cavity 114, and decreases a volume of the print material 102 within the expansion channel 112 as depicted in FIG. 4. The expansion of the gas 116 creates a pressure wave that is transmitted to the print material 102 within the expansion channel 112 and the nozzle bore 108. The first throat(s) 160 restricts or reduces a backpressure within the supply inlet 106 by the pressure wave, such that a majority of the pressure wave is directed into the nozzle bore 108. The pressure wave forces a volume of the print material from the nozzle 110 and toward a print medium 400 as depicted. In FIG. 4, the volume of the gas 116 and thus the volume of the gas cavity 114 are at their maximums. The depiction of FIG. 4 is at about 0.0004 seconds after the firing of the actuator 120 ($T_2=0.0004$ seconds).

Figure 5:
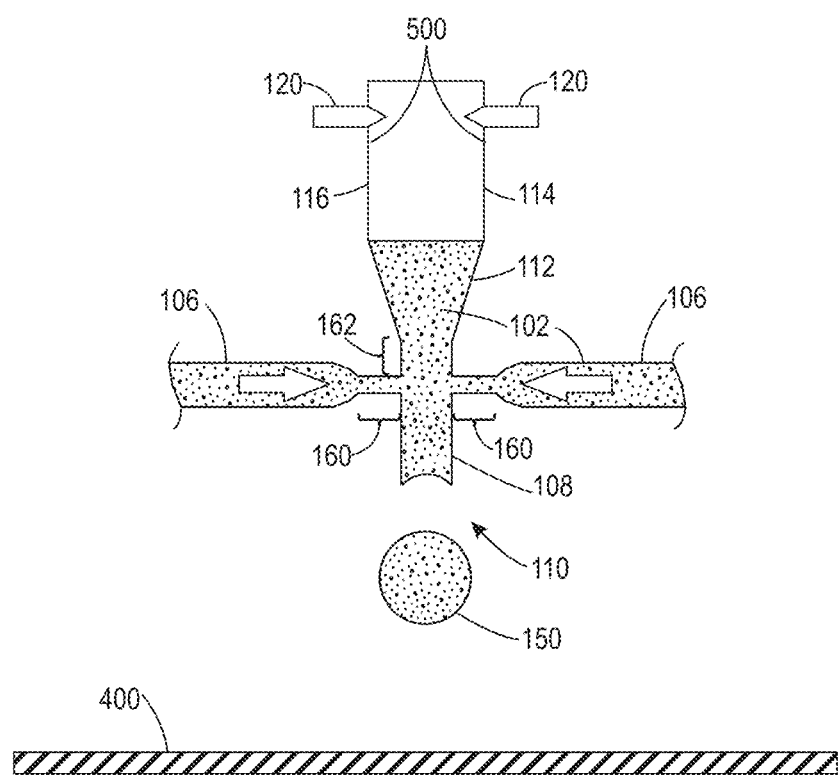
FIG. 5 is a depiction of the FIG. 4 jetting assembly during a subsequent point in the printing process.

As depicted in FIG. 5, the temperature and volume of the gas 116 rapidly decreases resulting from, at least in part, a cooling effect by walls 500 of the relatively cooler block 104. This rapid cooling creates a vacuum or negative pressure within the gas cavity 114, which is transferred to the expansion channel 112 and the supply inlet 106. This vacuum, along with wetting characteristics at the nozzle 110, results in an inflow of the print material 102 from the supply inlet 106 into the expansion channel 112 and the nozzle bore 108, thereby resupplying the expansion channel 112 and the nozzle bore 108 with the print material 102 from the supply inlet 106 and the reservoir 130. The vacuum also results in recessing of the print material 102 and retraction of a meniscus of the print material 102 within the nozzle 110 and the nozzle bore 108. Separation or snap-off of the drop 150 from the print material 102 remaining in the nozzle bore 108 occurs at about 0.00075 seconds ($T_3=0.00075$ seconds), while the depiction of FIG. 5 (retraction of the print material meniscus) occurs at about 0.0009 seconds after the firing of the actuator 120 ($T_4=0.0009$ seconds).

As depicted in FIG. 6, the volume of the gas cavity 114 cycles (i.e., increases and decreases), at least in part, as a result of pressure exerted by the print material 102 within the expansion channel 112, the nozzle bore 108, and at the nozzle 110. For example, after the firing of the actuator 120, the print material 102 protrudes from the nozzle at FIG. 4, retracts within the nozzle 110 at FIG. 5, and rebounds to again protrude from the nozzle 110 at FIG. 6. The depiction of FIG. 6 is at about 0.002 seconds after the firing of the actuator 120 ($T_4=0.002$ seconds).

Once the pressures and temperatures within the channels 106, 108, 112 and the gas cavity 114 have stabilized and return to equilibrium, the jetting assembly 100 returns to the position of FIG. 1. Another print cycle can be triggered by firing the actuator 120 either before or after the jetting assembly returns to the pre-firing state of FIG. 1.

It will be appreciated that the gas cavity 114 is at an end of a tall cylindrical channel provided by the expansion channel 112 and the nozzle bore 108. The material from which the block 104 is formed, for example ceramic, can be neutrally wetting or slightly non-wetting. When the gas 116 and thus the gas cavity 114 expands, a surface 600 of the print material 102 at the interface with the gas 116 maintains a roughly constant shape from the time the actuator 120 is fired until the drop 150 is ejected. Maintaining this roughly constant shape on the surface 600 reduces or eliminates waves on the surface 600 and splashing of the print material 102 into the gas 116 and the gas cavity 114. Splashing should be minimized to reduce interference with the operation of the actuator 120. In other words, splashing of the electrically conductive print material 102 onto the actuator 120, depending on the firing mechanism, could short electrodes for arc or corona discharge, a heat transfer rate of resistive heaters to the gas 116 could be negatively affected, and/or a beam from a light emitter such as a laser could be blocked from deposition of the print medium on the light emitter.

Further, the printing characteristics and drop ejection behavior of the jetting assembly 100, 200 can be tuned by sizing the dimensions of the channels defined by the block 104, 302, such as the cross-section, lengths, and the location or position of the supply inlet relative to the expansion channel 112, 306 and the nozzle bore 108, 308. Tuning the dimensions of one or more of the channels is useful, for example, for low-viscosity liquids such as molten metals, which experience less viscous damping than would an aqueous ink.

It is contemplated that the volume of the gas 116, and thus the volume of the gas cavity 114, could increase or decrease over time through one or more of several mechanisms. For example, gas entrained within the print material 102 may accumulate at and within the gas cavity 114. Further, the volume of the gas 116 may decrease from the gas 116 dissolving into the print material 102, or small bubbles of the gas 116 could separate and flow away within the print material 102. To maintain a desired volume of the gas 116 within the gas cavity 114, a slow flow of the gas 116 can be constantly fed into the gas cavity 114 through the gas inlet 200 in the block 104 as discussed above relative to FIG. 2. The block 104 can further include a small, restrictive vent or gas outlet 204 at the bottom of the gas cavity 114 that allows the volume of the gas 116 to grow when the volume of the gas 116 is insufficient. When the volume of the gas 116 becomes excessive, the gas outlet 204 is opened and allows the volume of the gas 116 to decrease. Alternately, a liquid filled exhaust channel at the height of maximum bubble displacement depicted in FIG. 4 would allow an excess volume of the gas 116 to overflow through the exhaust channel back to a reservoir or vent.

While the figures depict a jetting assembly 100, 300 including a single nozzle bore 108 terminating in a single nozzle 110, a jetting assembly including a plurality of nozzle bores 108 and a plurality of nozzles 110 arranged in a single row, a grid, an array, etc., is contemplated. The plurality of nozzles can be fired simultaneously using a single actuator or a plurality of actuators, or each nozzle can be fired independently and/or sequentially using a plurality of actuators. Since the sizes of the actuator 120 and the gas cavity 114 are roughly the same as the nozzle 110, such an array could have a high density of nozzles 110 and thus a high deposition rate and a good resolution. In contrast, alternatives such as magnetohydrodynamic printheads for metal jetting often feature more complex flow paths, with driving hardware positioned around each nozzle.

Figure 7:
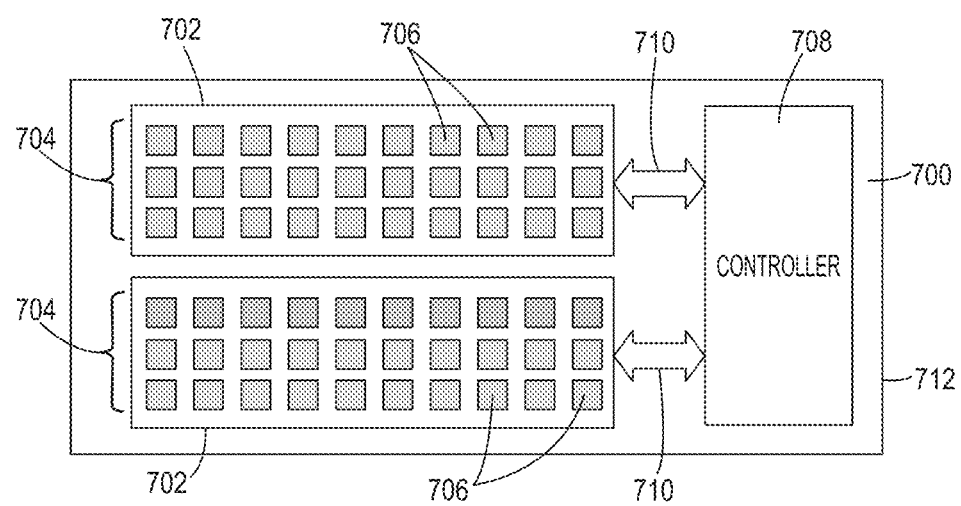
FIG. 7 is a schematic block diagram of a printer in accordance with another implementation of the present teachings.

FIG. 7 is a block diagram depicting a printer 700 in accordance with an implementation of the present teachings. The printer 700 includes a plurality of printheads 702, where each printhead 702 includes a jetting assembly array 704 having a plurality of jetting assemblies 706. Each jetting assembly 706 of the plurality of jetting assemblies 706 can be or include a jetting assembly 100, 300 as described above with reference to FIGS. 1-6, or another jetting assembly in accordance with the present teachings. The printer 700 further includes a controller 708 that is configured to communicate with the printheads 702 across one or more data buses 710. Additionally, the controller 708 can be configured to control other printing operations such as printer self-checks, cleaning operations, temperature monitoring and control of the printheads 702 and the print material 102 within the printheads 702, etc. The printheads 702 and controller 708 can be at least partially encased within an external housing 712.

Thus a jetting assembly, a printhead, and a printer in accordance with the present teachings can employ a rapidly heated bubble of trapped gas to eject drops of print material for printing such as 3D printing. The jetting assemblies described herein are described with reference to high temperature materials such as molten metal or metal alloys that would damage conventional piezoelectric jetting assemblies. It will be appreciated that use of the trapped gas can be used to eject conventional print material such as inks, for example, nonvolatile inks and inks without solvents needed for conventional thermal ink jetting. Heating of the gas can be controlled through electrical discharges in the gas, through resistive heating, or through optical heating of the trapped gas using, for example, a laser outputting a laser beam. It is contemplated that this mechanism can be used for both Drop On Demand printing or Continuous Ink Jet printing. In continuous jetting, a constant pressure can be applied to the supply inlet, where the constant pressure drives a constant stream of fluid out the nozzle 110 in addition to periodic firing of the actuator 120. The periodic firing of the actuator 120 results in a periodic variation in pressure at the nozzle 110 which causes a stream of the print material 102 that is forced from the nozzle 110 to break up into uniform drops 150.

In addition to using the teachings herein for printing of liquid metal to form 3D printed structures, metal printing in accordance herein can also be used during a functional printing process to form printed circuits and other electrically functional devices having a generally linear or planar orientation rather than a 3D element, as well as nanostructures including stationary and kinetic nanostructures.

Notwithstanding that the numerical ranges and parameters setting forth the broad scope of the present teachings are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g. −1, −2, −3, −10, −20, −30, etc.

While the present teachings have been illustrated with respect to one or more implementations, alterations and/or modifications can be made to the illustrated examples without departing from the spirit and scope of the appended claims. For example, it will be appreciated that while the process is described as a series of acts or events, the present teachings are not limited by the ordering of such acts or events. Some acts may occur in different orders and/or concurrently with other acts or events apart from those described herein. Also, not all process stages may be required to implement a methodology in accordance with one or more aspects or implementations of the present teachings. It will be appreciated that structural components and/or processing stages can be added or existing structural components and/or processing stages can be removed or modified. Further, one or more of the acts depicted herein may be carried out in one or more separate acts and/or phases. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items can be selected. As used herein, the term "one or more of" with respect to a listing of items such as, for example, A and B, means A alone, B alone, or A and B. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "conformal" describes a coating material in which angles of the underlying material are preserved by the conformal material. The term "about" indicates that the value listed may be somewhat altered, as long as the alteration does not result in nonconformance of the process or structure to the illustrated implementation. Finally, "exemplary" indicates the description is used as an example, rather than implying that it is an ideal. Other implementations of the present teachings will be apparent to those skilled in the art from consideration of the specification and practice of the disclosure herein. It is intended that the specification and examples be considered as exemplary only, with a true scope and spirit of the present teachings being indicated by the following claims.

Terms of relative position as used in this application are defined based on a plane parallel to the conventional plane or working surface of a workpiece, regardless of the orientation of the workpiece. The term "horizontal" or "lateral" as used in this application is defined as a plane parallel to the conventional plane or working surface of a workpiece, regardless of the orientation of the workpiece. The term "vertical" refers to a direction perpendicular to the horizontal. Terms such as "on," "side" (as in "sidewall"), "higher," "lower," "over," "top," and "under" are defined with respect to the conventional plane or working surface being on the top surface of the workpiece, regardless of the orientation of the workpiece.

The invention claimed is:

1. A jetting assembly for ejecting a print material, comprising:
    a jetting assembly block, wherein the jetting assembly block defines:
        a nozzle bore terminating in a nozzle from which a print material is ejected;
        an expansion channel that transitions into the nozzle bore;
        a gas cavity that transitions into the expansion channel; and
        a supply inlet for supplying a print material to the expansion channel and the nozzle bore, wherein the expansion channel is separated from the nozzle bore at the supply inlet; and
    an actuator that is positioned within the gas cavity and configured to expand a gas within the gas cavity.

2. The jetting assembly of claim 1, further comprising a gas within the gas cavity and a print material within the expansion channel, the supply inlet, and the nozzle bore.

3. The jetting assembly of claim 2, wherein the print material is a molten metal or molten metal alloy.

4. The jetting assembly of claim 3, wherein the print material comprises at least one of copper, aluminum, lead, tin, zinc, iron, magnesium, nickel, titanium, gold, and silver.

5. The jetting assembly of claim 2, wherein the print material is an aqueous ink.

6. The jetting assembly of claim 2, wherein the print material comprises at least one of a solvent, a pigment, a polymer-based ink, a resin, an ultraviolet-cured polymer, glass, a ceramic, a binder, a ceramic precursor, or a polymer precursor.

7. The jetting assembly of claim 1, wherein the actuator comprises at least two electrodes positioned within the gas cavity and configured to generate an electrical discharge into the gas cavity.

8. The jetting assembly of claim 7, wherein one of the at least two electrodes comprises the print material.

9. The jetting assembly of claim 1, further comprising a gas within the gas cavity, wherein the gas comprises argon, nitrogen, carbon dioxide, helium, and combinations thereof.

10. The jetting assembly of claim 1, wherein the jetting assembly block further defines:
    a gas inlet in fluid communication with a gas supply and the gas cavity; and
    a gas exhaust in fluid communication with the gas supply and the gas cavity.

11. A method for ejecting a print material from a jetting assembly, comprising:
    firing an actuator that is positioned within a gas cavity and to heat a volume of a gas within the gas cavity;
    increasing the volume of the gas responsive to the firing of the actuator;
    applying a pressure to a print material within an expansion channel using the volume of the gas that is increasing, wherein the expansion channel in in fluid communication with a nozzle bore and a nozzle; and
    ejecting a drop of the print material from the nozzle responsive to the firing of the actuator.

12. The method of claim 11, wherein the ejecting of the drop of the print material ejects a molten metal or molten metal alloy.

13. The method of claim 12, wherein the molten metal or metal alloy comprises at least one of copper, aluminum, lead, tin, zinc, iron, magnesium, nickel, titanium, gold, and silver.

14. The method of claim 11, wherein the ejecting of the drop of the print material ejects an aqueous ink.

15. The method of claim 11, wherein the ejecting of the drop of the print material ejects at least one of a solvent, a pigment, a polymer-based ink, a resin, an ultraviolet-cured polymer, glass, a ceramic, a binder, a ceramic precursor, or a polymer precursor.

16. The method of claim 11, wherein the gas within the gas cavity comprises at least one of argon, nitrogen, carbon dioxide, helium, and combinations thereof.

17. The method of claim 11, wherein the firing of the actuator comprises generating an electrical discharge into the gas cavity.

18. The method of claim 17, wherein the firing of the actuator comprises generating the electrical discharge using at least two electrodes, wherein one of the at least two electrodes is the print material.

19. The method of claim 11, wherein a surface of the print material at an interface with the gas within the gas cavity maintains a roughly constant shape from the firing of the actuator to the ejecting of the drop of the print material from the nozzle.

20. The method of claim 11 wherein:
the jetting assembly includes a block that defines a gas inlet in fluid communication with the gas cavity and a gas exhaust in fluid communication with the gas cavity and the gas inlet; and
the method further comprises regulating the volume of the gas within the gas cavity by:
injecting the gas from a gas source through the gas inlet into the gas cavity; and/or
exhausting the gas from the gas cavity through the gas exhaust.

21. The method of claim 11, wherein the jetting assembly comprises a plurality of nozzle bores terminating in a plurality of nozzles, and the method further comprises ejecting a plurality of drops of print material from the plurality of nozzles sequentially or simultaneously.

\* \* \* \* \*